Sept. 9, 1958  T. F. LINHART, JR., ET AL  2,851,574
THERMOCOUPLE REFERENCE JUNCTION Filed March 4, 1957  2 Sheets-Sheet 1

INVENTORS.
THEO F. LINHART, JR.
WALTER Y. FISH
RAYMOND L. HIXSON
BY Christie, Parker & Hale
ATTORNEYS

2,851,574

THERMOCOUPLE REFERENCE JUNCTION

Theo F. Linhart, Jr., Torrance, Walter Y. Fish, Los Angeles, and Raymond L. Hixson, Manhattan Beach, Calif., assignors to Arnoux Corporation, Los Angeles, Calif., a corporation of California Application March 4, 1957, Serial No. 643,623

8 Claims. (Cl. 219—20)

This invention relates to temperature measurement, and more particularly is concerned with apparatus for fixing the temperature of the reference junctions in a thermocouple temperature measuring system.

Thermocouple temperature measuring systems are well known and operate by sensing the thermoelectric potential generated whenever two junctions of dissimilar metals are maintained at two different temperatures. Changes in the temperature differential between the two junctions changes the thermoelectric potential between the two junctions. In order to equate this temperature difference to an absolute temperature measurement, one of the junctions must be maintained at a known reference temperature. Since the temperature difference is known by measuring the thermoelectric potential, the temperature at the other junction can then be determined.

It has been the practice heretofore in making very accurate temperature measurements by means of thermocouples to use an ice bath for establishing the temperature of the reference junction. However, for many airborne testing applications the use of an ice bath for the reference junction becomes impractical due to the high accelerations involved, bulkiness of the associated thermos bottle, the maintenance of a constant reference temperature for long periods of time over very large environmental temperature ranges, and the necessity of servicing the ice bath shortly before flight time.

Various automatic compensating circuits, which do not control the reference temperature but are arranged to compensate for variations due to temperature, have heretofore been developed. These consist of variable gain systems employing temperature-sensitive shunt or series resistors, or temperature-sensitive Wheatstone bridge arrangements for introducing a compensating voltage. The difficulty with these circuits is that the range of temperatures of the reference junction over which compensation is effected is quite limited for good accuracy. Moreover, where a multiple junction reference is desired, the compensating circuit becomes quite complicated since a separate compensated reference junction is required for each temperature-measuring channel.

The present invention provides an improved multiple thermocouple reference junction which gives extremely high accuracy over a broad range of ambient temperature conditions. The reference junction is small and compact, and rugged in its design. It is therefore not subject to the limitations of the ice bath as to servicing, bulkiness, and ruggedness in the presence of high accelerations and the like.

According to the present invention the reference junction is maintained at a constant temperature which is hotter than the operating temperature range of the measuring junction. In brief, the junction includes a block of metal having high heat conduction properties. The reference junctions are secured to the block by heat conductive cement to provide good heat transfer between the block and the junctions. All the junctions are spaced equidistant from a central point in the block, at which point is located a thermostatic device which controls the average current through heater wire wound on the block. The heater wire is made of a nickel-iron material whose electrical resistivity increases substantially with increases in temperature. The entire assembly is mounted in a heat insulator to isolate it from ambient temperature changes.

For a better understanding of the invention, reference should be had to the accompanying drawings wherein.

Figure 1:
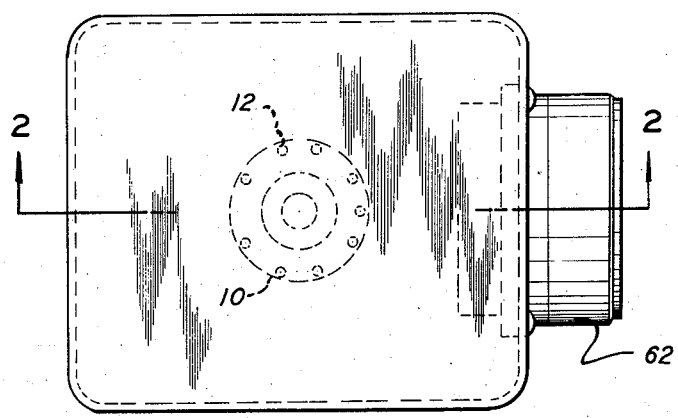
Fig. 1 is an elevational view of the thermocouple reference junction assembly.
Figure 3:
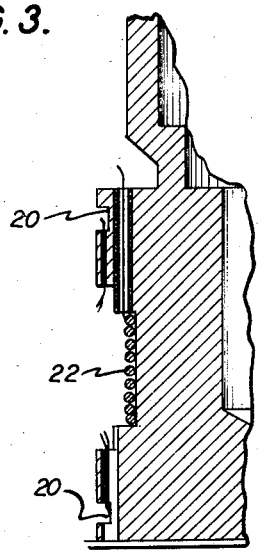
Fig. 3 is an enlarged fragmentary sectional view showing the manner in which the thermocouples are mounted.

Referring to the drawings in detail, the numeral 10 indicates generally a block of heat conductive material, which is preferably a non-ferrous metal such as aluminum or copper. As best shown in Fig. 1, the block 10 is substantially cylindrical in form and has a plurality of axially extending holes 12 around the periphery thereof. The central portion of the block 10 has a reduced diameter, as indicated at 14, thus forming two flanges at either end, such as indicated at 16 and 18. The openings 12 are radially positioned around the periphery of the block 10 a distance greater than the radius of the recessed portion 14, whereby the openings 12 are confined to the two flange portions 16 and 18.

The openings 12 are used to secure the thermocouple junctions in position. To this end the wires forming the thermocouple junctions are first coated, before assembly, with a heat conductive cement having good electrical insulation properties. A suitable cement consists of finely divided aluminum particles as a filler in a thermosetting plastic such as an epoxy resin or other synthetic resin as the vehicle. After the thermocouples are baked out to set the cement they are inserted in the holes 12. A pair of annular grooves, such as indicated at 20, undercut the openings 12. Thus with the thermocouples in position, the ends of the wires forming the junctions are located in the recessed regions formed by the annular grooves 20. The junctions are pressed against the bottom of the grooves in contact with the block 10. Additional cement is then used to fill the holes 12 and the grooves 20, and the entire assembly baked to cure the cement. Because the cement is a good heat conductor while being a relatively poor electrical conductor, good thermal conductivity is established between the block and each of the thermocouple junctions and yet they are electrically insulated from each other.

The block 10 is heated to its desired temperature by means of heater wire wound around the block in the recessed region 14, intermediate the two groups of thermocouples in the respective flange portions 16 and 18.

One of the features of the present invention which contributes to the greatly improved performance of the reference junction is a substantially proportional heater control, which is accomplished by using heater wire having a high positive coefficient of temperature resistivity. A wire made of an alloy of nickel and iron in the proportions of approximately 40% and 60%, respectively, has such a characteristic. An example of a wire which has given satisfactory performance is a 5 mil Formvar Balco wire. The heater wire is wound over a layer of glass tape to insulate it electrically from the block. Fifty ohms of the wire is wound with a non-inductive type winding to greatly reduce the generation of alternating current magnetic fields.

By virtue of the high positive coefficient of temperature resistivity, high current input and heater power dissipation occur at ambient or lower temperatures, as at the start of the operating period. As the associated thermal mass comes up to operating temperature, the resistance of the heater wire increases, thus drawing less and less current as the operating temperature is approached. An essentially proportional control is thereby obtained. As a result, the thermal mass receives only enough power to maintain its temperature at the selected reference value and to compensate for the small amount of thermal loss experienced from the block. In addition, the substantially proportional control produced by the alloy heater wire prevents substantial overshoot as the block is brought up to operating temperature.

In order to control the heater current to maintain the block at substantially constant temperature, thermostatic means is provided. To this end a mercury bulb thermometer 24 is positioned in a hole 26 formed in the block 10 along the central axis thereof. When in position, the mercury thermometer 24 has its bulb in contact with the bottom of the hole 26, the bottom of the hole 26 being located at a point such that the bulb of the thermometer is positioned substantially equidistant from all of the thermocouple junctions.

The thermometer 24 has a pair of conductive electrodes 28 and 29 which are in electrical contact with mercury in the thermometer capillary column 30. The mercury in the column 30 acts as a switch completing an electrical circuit between the two electrodes 28 and 29. The uppermost electrode is accurately positioned to coincide with the height of the mercury column at the desired operating temperature.

Figure 4:
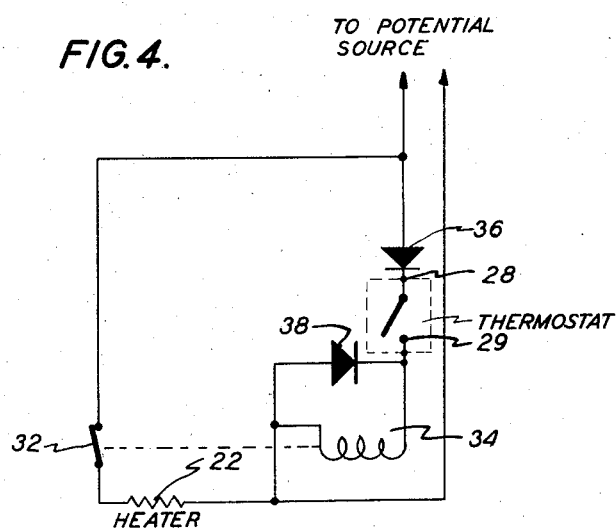
Fig. 4 is a schematic wiring diagram of the heater control.
Figure 2:
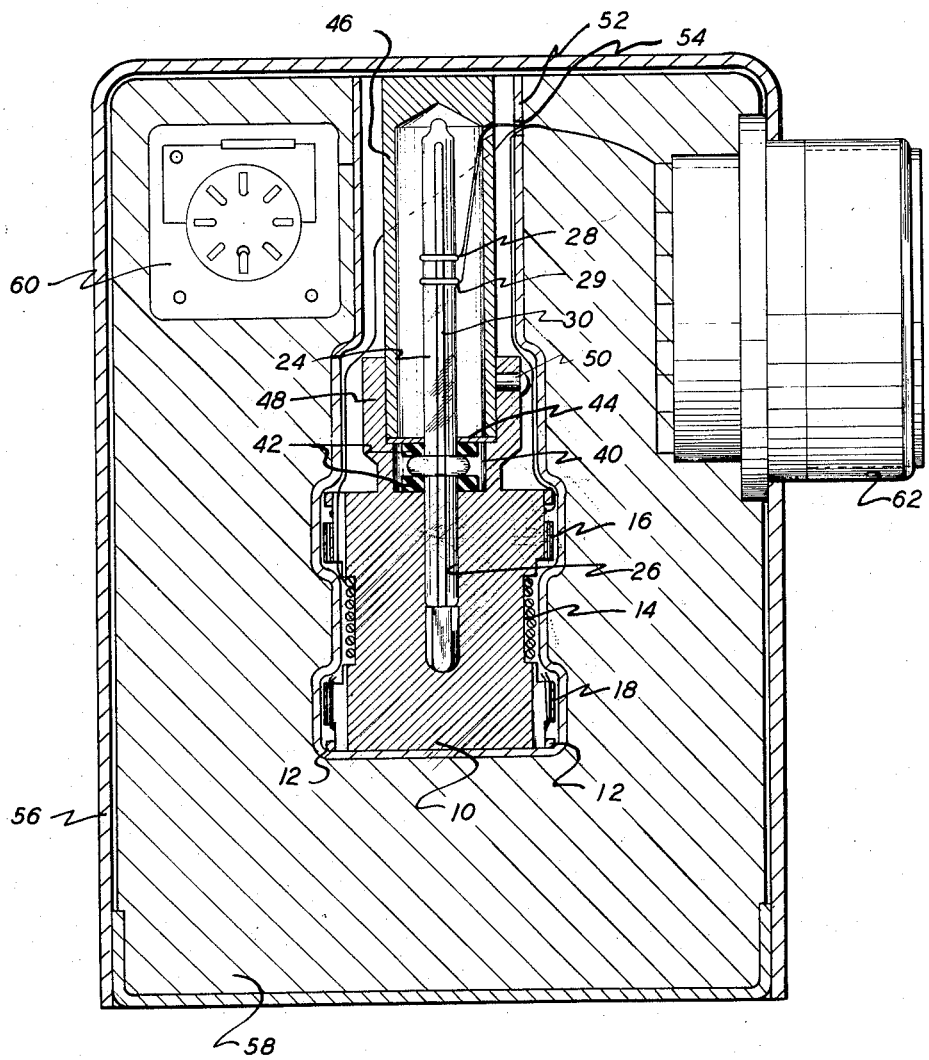
Fig. 2 is a sectional view taken substantially on the line 2—2 of Fig. 1.

The heater control circuit is shown schematically in Fig. 4. The heater 22 is connected across a source of potential (not shown) through a relay-operated switch 32. The relay switch 32 is actuated by a relay coil 34 that is connected across the potential source through the thermostatic switch formed by the electrodes 28 and 29 of the mercury thermometer and the mercury column. A series diode 36 is used to protect the arc suppression relay and the mercury switch in the event the D. C. heater supply potential is accidentally reversed. Another diode 38 may be shunted across the coil 34 for the purpose of reducing arcing of the thermostatic switch.

The mercury thermometer is held in position by means of an integral shoulder 40 formed thereon, which is engaged on either side by a pair of rubber washers 42. A metallic washer 44 presses against the upper rubber washer, and the lower rubber washer engages the top of the block 10. A cap 46 covers the upper end of the thermometer, the lower end of the cap 46 fitting into a cylindrical flange 48 which is integrally formed with the block 10. The cap 46 is held in position within the flange 48 by any suitable means, such as a rivet 50, the lower end of the cap 46 engaging the washer 44 whereby the thermometer is clamped into position.

To reduce heat loss by radiation, the entire assembly is wrapped in aluminum, such as indicated at 52. All of the leads from the thermocouples, the heater, and the thermostat electrodes are brought out through an opening 54 in the aluminum wrapping. The entire assembly is then positioned in an hermetically sealed can, indicated generally at 56, the entire reference junction assembly being suspended inside the can by suitable insulating material 58, such as a potting compound. The relay controlling the heater may also be positioned within the hermetically sealed can 56, such as indicated at 60. All of the electrical connections are brought out through a suitable multiple-pin connector 62 mounted in the wall of the hermetically sealed can 56.

It will be seen from the above description that a highly compact, rugged, reference junction is provided, capable of very close temperature regulations for high accuracy.

The reference junction design provides for temperature control of a large number of thermocouple junctions simultaneously. Minimum temperature gradients are maintained between the thermocouple junctions, the thermal sink, and the control thermometer by the particular design of the block and arrangement of the junctions, heater wire, and thermometer.

What is claimed is:

1. A thermocouple reference junction apparatus comprising a cylindrical block of good heat conductive metal, the block including a pair of spaced flange sections around the periphery thereof, the flange sections having a plurality of holes therein extending parallel to the axis of revolution of the cylindrical block, the block further including a hole along said axis extending into the center of the block, a plurality of reference thermocouple junctions of dissimilar metal wires positioned in each of said holes in the flange sections, an electrically insulating cement in said holes for securing in heat-conductive relationship to the block the thermocouple junctions in position in the holes and insulating the associated wires forming the junctions electrically from the block, iron-nickel heater wire having a resistance value that increases with temperature wound on the block in the region between the two flange sections, thermostatic switch means including a mercury thermometer positioned in the axial hole in the block with the heat sensing portion thereof positioned in a plane substantially halfway between the two flange sections, whereby the temperature of the block is sensed in a region surrounded by the heater wire and equally spaced from all of the junctions, electrical means controlled by the thermostatic switch means for cycling current through the heater to maintain the temperature of the block at a predetermined level above the normal ambient temperature range, and heat insulating means surrounding the block and associated thermocouples for insulating the block against heat loss.

2. A thermocouple reference junction apparatus comprising a block of good heat conductive material, the block including a pair of spaced flange sections around the periphery thereof, the flange sections having a plurality of holes therein extending parallel to a common central axis and equally spaced therefrom, the block further including a hole along said axis extending into the center of the block, a plurality of reference thermocouple junctions of dissimilar metal wires positioned in each of said holes in the flange sections, a thin electrically insulating cement in said holes for securing the thermocouple junctions in position in the holes in heat-conductive relationship to the block, iron-nickel heater wire having a resistance value that increases with temperature wound on the block in the region between the two flange sections, and thermostatic switch means including a mercury thermometer positioned in the axial hole in the block with the heat sensing portion thereof positioned axially in a plane substantially halfway between the two flange sections whereby the temperature of the block is sensed in a region surrounded by the heater wire and equally spaced from all of the junctions, electrical means controlled by the thermostatic switch means for cycling current through the heater to maintain the temperature of the block at a predetermined level above the normal ambient temperature range.

3. A thermocouple reference junction apparatus comprising a block of good heat conductive material, the block including a pair of spaced flange sections around the periphery thereof, the flange sections having a plurality of holes therein equally spaced from the axis of revolution of the cylindrical block, the block further including a hole along said axis extending into the center of the block, a plurality of reference thermocouple junctions of dissimilar metal wires positioned in each of said holes in the flange sections, a thin electrically insulating cement in said holes for securing the thermocouple junctions in position in the holes in heat-conductive relationship to the block, iron-nickel heater wire having a resistance value that increases with temperature wound on the block in the region between the two flange sections, thermostatic switch means positioned in the axial hole in the block with the heat sensing portion thereof positioned axially in a plane substantially halfway between the two flange sections, whereby the temperature of the block is sensed in a region surrounded by the heater wires and equally spaced from all of the junctions, electrical means controlled by the thermostatic switch means for cycling current through the heater to maintain the temperature of the block at a predetermined level above the normal ambient temperature range, and heat insulating means surrounding the block and associated thermocouples for insulating the block against heat loss.

4. A thermocouple reference junction apparatus comprising a block of good heat conductive material, the block including a pair of spaced flange sections around the periphery thereof, the flange sections having a plurality of holes therein extending parallel to the axis of revolution of the cylindrical block, the block further including a hole along said axis extending into the center of the block, a plurality of reference thermocouple junctions of dissimilar metal wires positioned in each of said holes in the flange sections, means for securing the thermocouple junctions in position in the holes in heat-conductive relationship to the block, heater means surrounding the block in the region between the two flange sections, thermostatic switch means positioned in the axial hole in the block with the heat sensing portion thereof positioned axially in a plane substantially halfway between the two flange sections, whereby the temperature of the block is sensed in a region surrounded by the heater means and equally spaced from all of the junctions, electrical means controlled by the thermostatic switch means for cycling current through the heater to maintain the temperature of the block at a predetermined level above the normal ambient temperature range, and heat insulating means surrounding the block and associated thermocouples for insulating the block against heat loss.

5. A thermocouple reference junction apparatus comprising a block of good heat conductive material, the block including at least one flange section around the periphery thereof, the flange section having a plurality of holes therein extending parallel to the axis of revolution of the cylindrical block, the block further including a hole along said axis extending into the center of the block, a plurality of reference thermocouple junctions of dissimilar metal wires positioned in each of said holes in the flange section, means in said holes for securing the thermocouple junctions in position in the holes in heat-conductive relationship to the block, iron-nickel heater wire having a resistance value that increases with temperature wound on the block, thermostatic switch means positioned in the axial hole in the block with the heat sensing portion thereof being equally spaced from all of the junctions, electrical means controlled by the thermostatic switch means for cycling current through the heater to maintain the temperature of the block at a predetermined level above the normal ambient temperature range, and heat insulating means surrounding the block and associated thermocouples for insulating the block against heat loss.

6. A thermocouple reference junction apparatus comprising a block of good heat conductive material, the block including at least one section having a plurality of holes therein spaced equally from the central axis of the block, the block further including a hole along said axis extending into the center of the block, a plurality of reference thermocouple junctions of dissimilar metal wires positioned in each of said holes in the section of the block, means for securing the thermocouple junctions in position in the holes in heat-conductive relationship to the block and electrically insulating the associated wires forming the junctions from the block, heater means surrounding the block, thermostatic switch means positioned in the axial hole in the block with the heat sensing portion thereof being equally spaced from all of the junctions, electrical means controlled by the thermostatic switch means for cycling current through the heater means to maintain the temperature of the block at a predetermined level above the normal ambient temperature range, and heat insulating means surrounding the block and associated thermocouples for insulating the block against heat loss.

7. A thermocouple reference junction apparatus comprising a block of good heat conductive material, the block including a pair of spaced flange sections around the periphery thereof, the flange sections having a plurality of holes therein extending parallel to the axis of revolution of the cylindrical block, the block further including a hole along said axis extending into the center of the block, a plurality of reference thermocouple junctions of dissimilar metal wires positioned in each of said holes in the flange sections, means for securing the thermocouple junctions in position in the holes and insulating the associated wires forming the junctions electrically from the block, iron-nickel heater wire having a resistance value that increases with temperature wound on the block in the region between the two flange sections, and thermostatic switch means positioned in the axial hole in the block with the heat sensing portion thereof positioned axially at a point substantially halfway between the two flange sections, whereby the temperature of the block is sensed in the region surrounded by the heater wires and equally spaced from all of the junctions, electrical means controlled by the thermostatic switch means for cycling current through the heater to maintain the temperature of the block at a predetermined level above the normal ambient temperature range.

8. A thermocouple reference junction apparatus comprising a block of good heat conductive material, the block including a section around the periphery thereof having a plurality of holes therein equally spaced from the central axis of the block, the block further including a hole along said axis extending into the center of the block, a plurality of reference thermocouple junctions of dissimilar metal wires positioned in each of said holes in the section of the block, a thin electrically insulating heat conductive cement in said holes for securing the thermocouple junctions in position in the holes and insulating the associated wires forming the junctions electrically from the block, heater means surrounding the block, thermostatic switch means positioned in the axial hole in the block with the heat sensing portion thereof being equally spaced from all of the junctions and from the heater means, and electrical means controlled by the thermostatic switch means for cycling current through the heater means to maintain the temperature of the block at a predetermined level above the normal ambient temperature range.

References Cited in the file of this patent

UNITED STATES PATENTS

| | | |
|---|---|---|
| 1,940,599 | Marrison | Dec. 19, 1933 |
| 1,974,302 | Finlayson | Sept. 18, 1934 |
| 2,025,534 | Sheard et al. | Dec. 24, 1935 |
| 2,032,417 | Jacobs | Mar. 3, 1936 |
| 2,516,666 | Applegate | July 25, 1950 |
| 2,528,377 | Maltby | Oct. 31, 1950 |
| 2,680,224 | Carton | June 1, 1954 |